(12) United States Patent
Brox et al.

(10) Patent No.: US 12,086,005 B2
(45) Date of Patent: Sep. 10, 2024

(54) TRACKING A REFERENCE VOLTAGE AFTER BOOT-UP

(71) Applicant: Micron Technology, Inc., Boise, ID (US)

(72) Inventors: Martin Brox, Munich (DE); Thomas Hein, Munich (DE); Wolfgang Anton Spirkl, Germering (DE); Andrea Sorrentino, Munich (DE); Peter Mayer, Neubiberg (DE)

(73) Assignee: Micron Technology, Inc., Boise, ID (US)

( * ) Notice: Subject to any disclaimer, the term of this patent is extended or adjusted under 35 U.S.C. 154(b) by 189 days.

(21) Appl. No.: 17/729,813

(22) Filed: Apr. 26, 2022

(65) Prior Publication Data

US 2023/0341915 A1  Oct. 26, 2023

(51) Int. Cl.
*G06F 1/28* (2006.01)
*G06F 1/20* (2006.01)

(52) U.S. Cl.
CPC .............. *G06F 1/28* (2013.01); *G06F 1/206* (2013.01)

(58) Field of Classification Search
CPC .................................. G06F 1/28; G06F 1/206
See application file for complete search history.

(56) References Cited

U.S. PATENT DOCUMENTS

| | | | |
|---|---|---|---|
| 10,001,800 B1 * | 6/2018 | Takayanagi | G05F 3/02 |
| 11,132,037 B2 * | 9/2021 | Nowell | G06F 1/206 |
| 2008/0052542 A1 * | 2/2008 | Capps | G06F 1/26 |
| | | | 713/300 |
| 2016/0162297 A1 * | 6/2016 | Shao | G06F 9/4401 |
| | | | 713/2 |
| 2020/0081507 A1 * | 3/2020 | Nowell | G06F 1/206 |
| 2023/0068702 A1 * | 3/2023 | Muchherla | G11C 29/028 |
| 2023/0197119 A1 * | 6/2023 | Fisher | G06F 3/064 |
| | | | 365/211 |
| 2023/0266901 A1 * | 8/2023 | Khayat | G11C 29/021 |

* cited by examiner

*Primary Examiner* — Zahid Choudhury
(74) *Attorney, Agent, or Firm* — Holland & Hart LLP

(57) ABSTRACT

Methods, systems, and devices for tracking a reference voltage (also referred to as $V_{REFD}$) after boot-up are described. For example, a host device or a memory device may determine a temperature value associated with the memory device. The host device or the memory device may select a reference voltage offset value for the memory device based on mapping the temperature value associated with the memory device to a relationship between reference voltage offset values and temperature differential values associated with the memory device. The host device or the memory device may adjust a reference voltage value associated with the memory device based on the reference voltage offset value. The host device, or the memory device, may operate the memory device in accordance with the reference voltage value based on adjusting the reference voltage value.

35 Claims, 7 Drawing Sheets

TRACKING A REFERENCE VOLTAGE AFTER BOOT-UP

FIELD OF TECHNOLOGY

The following relates to one or more systems for memory, including tracking a reference voltage after boot-up.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may, be stored. To access the stored information, a component may read (e.g., sense, detect, retrieve, identify, determine, evaluate) a stored state in the memory device. To store information, a component may write (e.g., program, set, assign) the state in the memory device.

Various ty pes of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
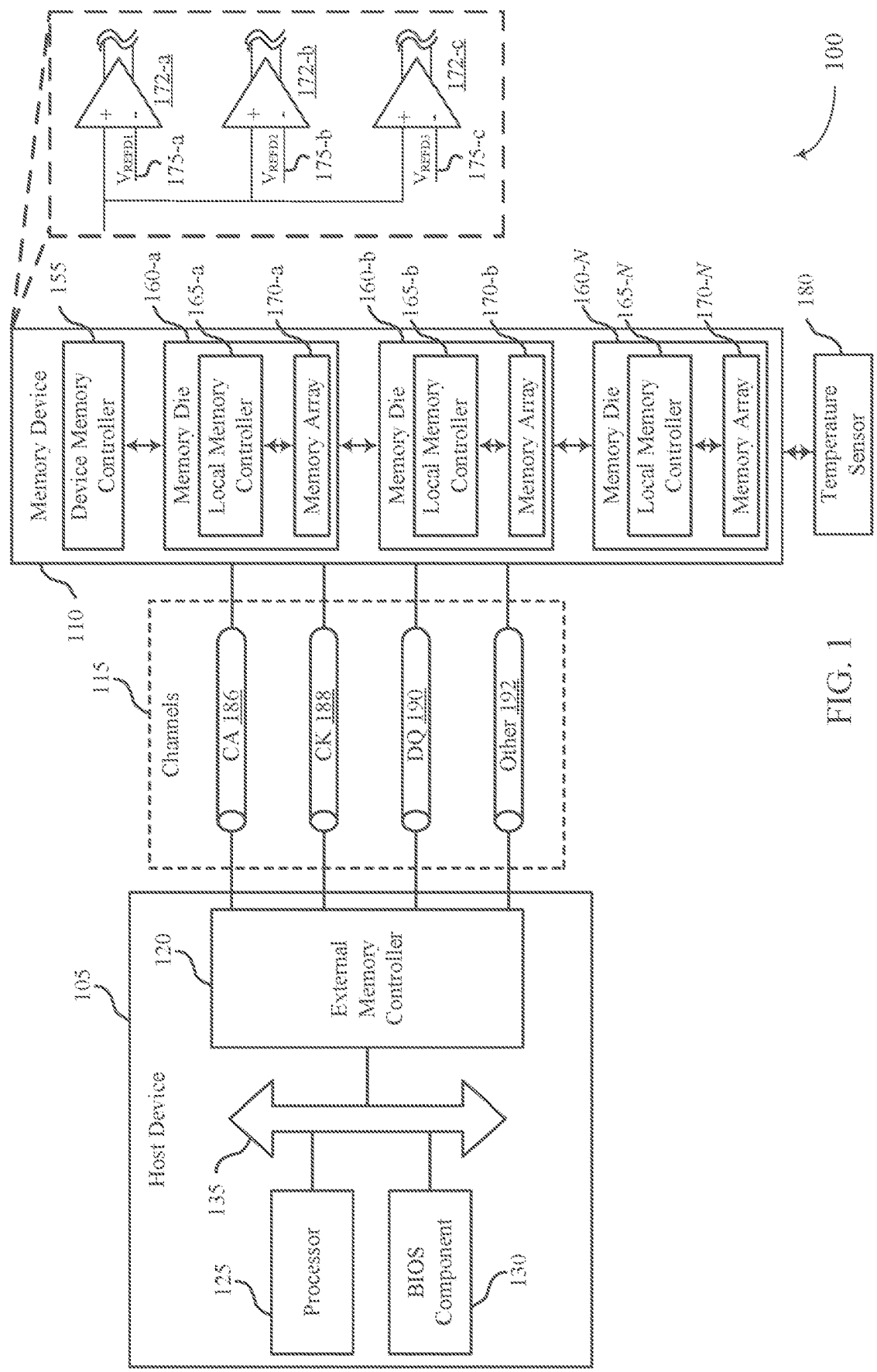
FIG. 1 illustrates an example of a system that supports tracking a reference voltage after boot-up in accordance with examples as disclosed herein.

A memory device may support various operations and may be operable to receive, transmit, or execute commands, data, or control information related to components of the memory device. The memory device may be or include one or multiple level pulse amplitude modulation (PAM) transceiver, for example, a four-level pulse amplitude modulation (PAM-4) transceiver configured to one or both of transmit or receive data or control information. The PAM transceiver may support multilevel signaling for transmission or reception of data or control information. The PAM transceiver may include a number of pseudo-differential pre-amplifiers and a number of data latches. Although the PAM transceiver may achieve a higher data rate via multi-level signaling than other transceivers, the PAM transceiver may experience a lower voltage margin. To increase stability requirements for the PAM transceiver, the PAM transceiver may be configured to improve the handling of the voltage margins both for a receiver chain and a transmitter chain of the PAM transceiver. In some cases, a voltage margin for the receiver chain of the PAM transceiver may be improved by determining a preferred reference voltage value ($V_{REFD}$) for the PAM transceiver.

The memory device may support a search procedure (which may also be referred to as a training procedure), in which the memory device determines the preferred reference voltage value (e.g., for the PAM transceiver). For example, the memory device may perform the search procedure during a boot-up mode of the memory device. In some cases, to reduce an impact of noise to circuit elements of the memory device, the memory device may capacitively buffer the reference voltage value. Due to the capacitive aspect (e.g., buffering) and timing requirements of the search procedure, however, the memory device may experience unwanted latency for transitioning to the preferred reference voltage value. In some cases, a parameter (such as a temperature) associated with the memory device, such as for the PAM transceiver, may vary during different modes of operation (e.g., boot-up mode and/or post boot-up mode). Because of the variance in the parameter, such as the temperature, associated with the memory device, the memory device may experience suboptimal voltage margins. Additionally, because the search procedure is performed by the memory device during boot-up mode, some other different techniques fail to address the variance in the parameter (e.g., temperature) during post boot-up mode (e.g., after the device has fully heated up and the temperature is higher than during the boot-up mode).

Various aspects of the present disclosure relate to controlling a respective reference voltage value of one or more circuit elements (e.g., pseudo-differential pre-amplifiers of the PAM transceiver) associated with the memory device. The memory device may track parameter variation, such as temperature variation, of the one or more circuit elements during post boot-up operation and select a respective reference voltage offset value to apply to each of the one or more one or more circuit elements (e.g., pseudo-differential pre-amplifiers of the PAM transceiver) of the memory device based on a dependency between the parameter variation and the respective reference voltage offset value. For example, the memory device may be coupled with a sensor (e.g., a temperature sensor) of the memory device or a component of the memory device such as the memory die, which may sense parameter values (such as temperature values) at a time of programming of the respective reference voltage values for the one or more circuit elements (e.g., pseudo-differential pre-amplifiers of the PAM transceiver) associated with the memory device. The programming may, in some examples, correspond to accessing a reference voltage value register.

Subsequently, the memory device may periodically or aperiodically determine a parameter value (such as a temperature value) for the one or more circuit elements (e.g., pseudo-differential pre-amplifiers of the PAM transceiver) associated with the memory device and offset the respective reference voltage values for the one or more circuit elements by a respective reference voltage offset value, which may be dependent on a relationship between one or more reference voltage offset values and one or more parameter (e.g., temperature) differential values associated with the memory device. The dependency of the respective reference voltage offset value on the parameter (e.g., temperature) differential values may be programmed into the memory device. By enabling the memory device to support tracking a parameter (e.g., temperature) value associated with the memory device and adjusting a voltage reference value by a reference voltage offset value dependent on a relationship (e.g., a linear relationship, a non-linear relationship), the memory device may experience improved voltage margins and efficient operations without impact to other operation of the memory device.

Features of the disclosure are initially described in the context of systems and dies as described with reference to FIGS. 1 and 2. Features of the disclosure are described in the context a process flow and graphs as described with reference to FIGS. 3 and 4A-4C. These and other features of the disclosure are further illustrated by and described with reference to an apparatus diagram and flowcharts that relate to tracking a reference voltage after boot-up as described with reference to FIGS. 5-10.

FIG. 1 illustrates an example of a system 100 that supports tracking a reference voltage after boot-up in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 10. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 191), one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of an M-array modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e g., PAM2), and others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

The memory device 110 may support various operations and may be operable to receive, transmit, or execute commands, data, or control information related to components of the memory device. For example, the memory device 110 may be or include a transceiver, such as a PAM-4 transceiver, configured to one or both of transmit or receive data or control information. The transceiver may support multi-level signaling for transmission or reception of data or control information. The transceiver may include a number of pseudo-differential pre-amplifiers 172. For example, a PAM transceiver may include three pseudo-differential pre-amplifiers, such as a first amplifier 172-a (e.g., $V_{REFD1}$), a second amplifier 172-b (e.g., $V_{REFD2}$), and a third amplifier 172-c (e.g., $V_{REFD3}$). Each of the amplifiers 172 may correspond to a separate reference voltage value 175 designed to correspond to (e.g., bisect) each of an upper, middle, and lower data PAM eyes as described with reference to FIG. 2. The first amplifier 172-a may correspond to a first reference voltage value 175-a, the second amplifier 172-b may correspond to a second reference voltage value 175-b, and the third amplifier 172-c may correspond to a third reference voltage value 175-c. In other examples, the memory device 110 may be a PAM-4 configured with a single transceiver (e.g., a receiver) and may implement one or more of the operations described herein.

As described herein, one or both of the host device 105 or the memory device 110 may support controlling a respective reference voltage value 175 for each of the one or more amplifiers 172 associated with the memory device 110. Additionally or alternatively, one or more of the external memory controller 120, the device memory controller 155, or the local memory controller 165, or any combination thereof, may support controlling a respective reference voltage value 175 for each of the one or more amplifiers 172 associated with the memory device 110. One or both of the host device 105 or the memory device 110 may track temperature variation associated with the memory device 110 during one or both of boot-up operation or post boot-up operation, and select a respective reference voltage offset value for at least some if not each of the one or more amplifiers 172 associated with the memory device 110, and to apply to each of the one or more amplifiers 172. By way of example a temperature sensor 180 may be coupled with (or included in) the memory device 110 (and/or one or more other components of the memory device 110) to provide temperature values associated with the memory device 110, temperature values associated with one or more components of the memory device 110 (e.g., device memory controller 155, memory die(s) 160, local memory controller(s) 165). Additionally or alternatively, the temperature sensor 180 may be coupled with the host device 105 to provide temperature values (e.g., associated with the memory device 110).

The selection of the respective reference voltage offset value for at least some if not each of the one or more amplifiers 172 associated with the memory device 110 may be based on a dependency between the temperature variation and the respective reference voltage offset value as described herein. By enabling one or both of the host device 105 or the memory device 110 to support tracking a temperature value associated with the memory device 110 and adjusting a respective voltage reference value for each of the one or more amplifiers 172 associated with the memory device 110 by a reference voltage offset value dependent on a relationship (e.g., a linear and/or non-linear relationship), the memory del ice 110 will experience improved voltage margins, more accurate reference voltage management, and more efficient operations without impact to procedures of the memory device 110.

Figure 2:
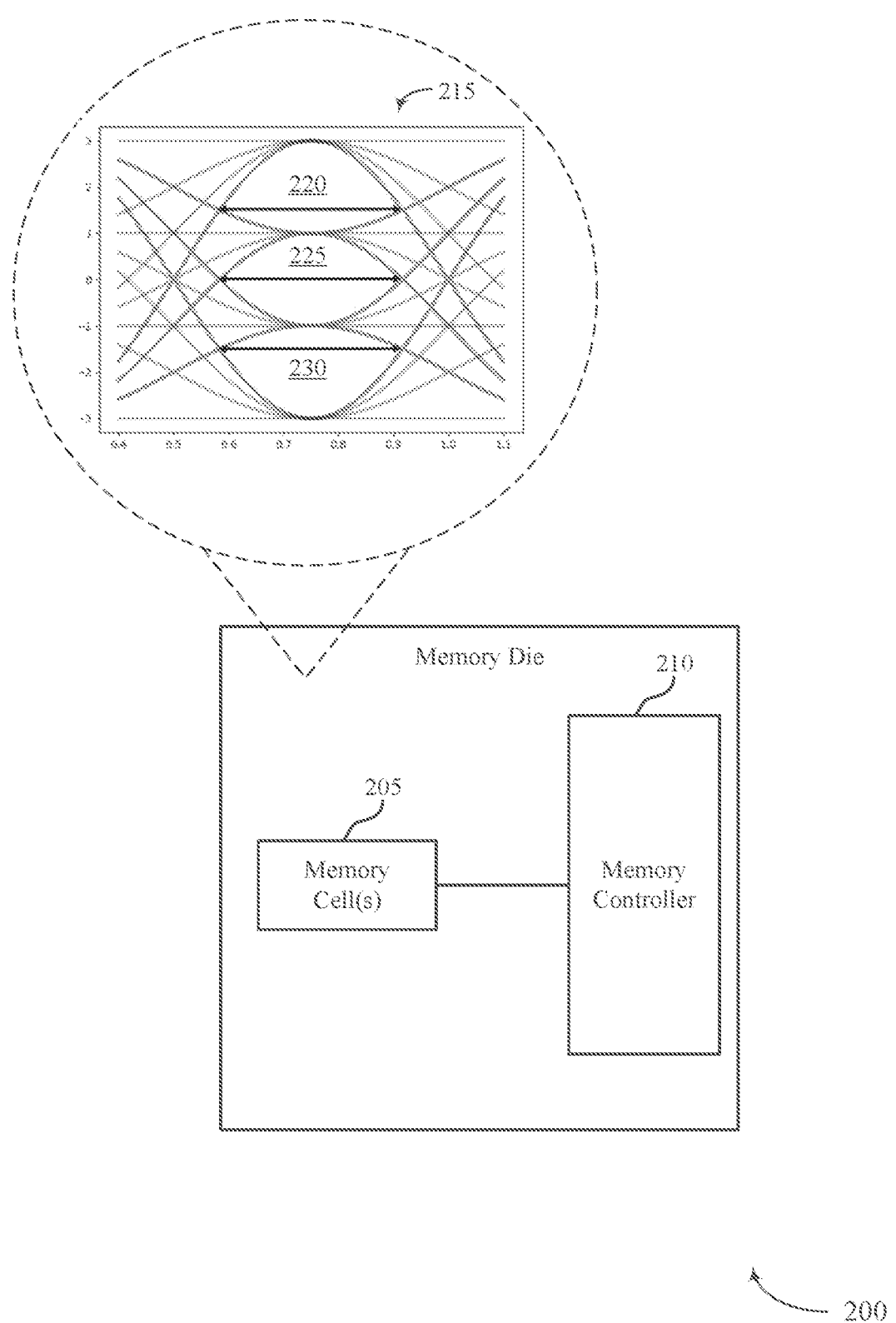
FIG. 2 illustrates an example of a memory die that supports tracking a reference voltage after boot-up in accordance with examples as disclosed herein.

FIG. 2 illustrates an example of a memory die 200 that supports tracking a reference voltage after boot-up in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

The memory die 200 may support various operations and may be operable to receive, transmit, or execute commands, data, or control information related to components of the memory device. For example, the memory die 200 may be or include a PAM transceiver configured to one or both of transmit or receive data or control information. The PAM transceiver may support multilevel signaling for transmission or reception of data or control information. The PAM transceiver may include a number of pseudo-differential pre-amplifiers. For example, a PAM transceiver may include three pseudo-differential pre-amplifiers. Each of the pseudo-differential pre-amplifiers may correspond to a separate reference voltage value designed to correspond to (e.g., bisect) aspects of one or more PAM eyes 215, including an upper PAM eye 220, a middle PAM eye 225, and a lower PAM eye 230. As described herein, the memory die 200 may support controlling a respective reference voltage value for at least some if not each of the one or more pseudo-differential pre-amplifiers associated with the memory die 200.

In some examples, a memory controller 210 of the memory die 200 may track parameter variations, such as temperature variation, associated with the memory die 200 during one or both of boot-up operation or post boot-up operation, and select a respective reference voltage offset value for each of the one or more pseudo-differential pre-amplifiers associated with the memory die 200, and to apply to each of the one or more pseudo-differential pre-amplifiers. The selection of the respective reference voltage offset value for at least some if not each of the one or more pseudo-differential pre-amplifiers associated with the memory die 200 may be based on a dependency between the temperature variation and the respective reference voltage offset value as described herein. By enabling the memory controller 210 of the memory die 200 to support tracking a temperature value associated with memory die 200, a temperature value associated with one or more components of the memory die 200, or other components, and adjusting a respective voltage reference value for each of the one or more pseudo-differential pre-amplifiers associated with the memory die 200 by a reference voltage offset value dependent on a relationship (e.g., a linear and/or non-linear relationship), the memory die 200 will experience improved voltage margins, more accurate reference voltage management, and more efficient operations without impact to procedures of the memory die 200.

Figure 3:
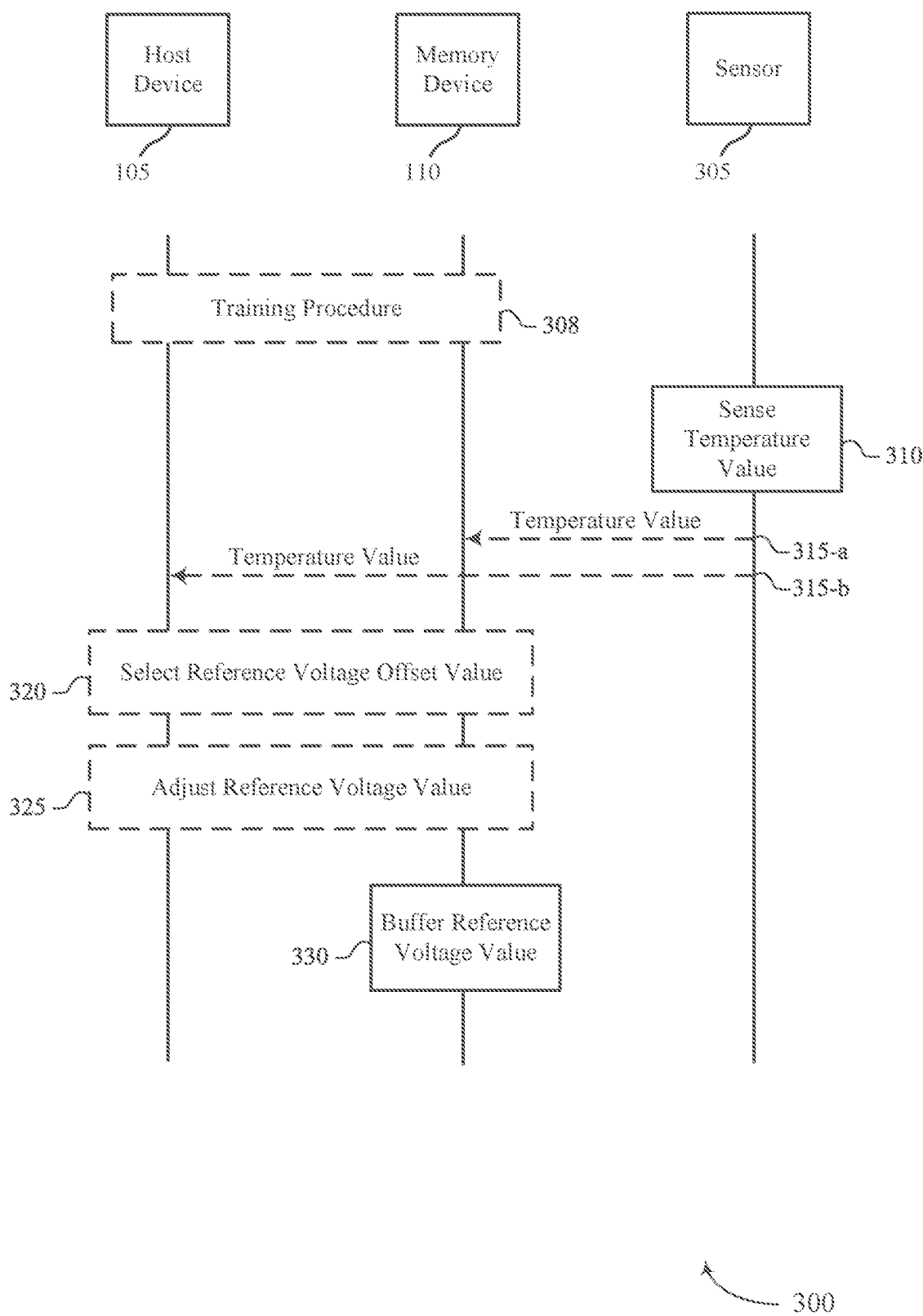
FIG. 3 illustrates an example of a process flow that supports tracking a reference voltage after boot-up in accordance with examples as disclosed herein.

FIG. 3 illustrates an example of a process flow 300 that supports tracking a reference voltage after boot-up in accordance with examples as disclosed herein. The process flow 300 may implement aspects of the system 100 or may be implemented by aspects of the system 100 as described with reference to FIG. 1. For example, the process flow 300 may be implemented by a host device 105 or a memory device 110. One or both of the host device 105 or the memory device 110 may be examples of a host device 105 or a memory device 110 as described with reference to FIG. 1. Additionally, the process flow 300 may be implemented by a sensor 305, which may be examples of a sensor as described with reference to FIG. 1. Additionally or alternatively, the process flow 300 may implement aspects of the memory die 200 or may be implemented by aspects of the memory die 200 as described with reference to FIG. 2. The memory die 200 may be an example of the memory dies 160 described with reference to FIG. 1. In some examples, the memory die 200 may be referred to as a memory chip, a memory device, or an electronic memory apparatus. In the following description of the process flow 300, the operations between one or both of the host device 105 or the memory device 110 may be performed in a different order than the example order shown, or the operations performed by one or both of the host device 105 or the memory device 110 may be performed in different orders or at different times. Some operations may also be omitted from the process flow 300, and other operations may be added to the process flow 300.

At 308, one or both of the host device 105 or the memory device 110 may perform a training procedure, which may include one or more operations, such as programming of a reference voltage value for the memory device 110. Additionally, or alternatively, the training procedure may include one or more of the host device 105, the memory device 110, or the sensor 305 tracking one or more temperature values associated with the memory device 110 during a duration (e.g., a duration after a portion of or a completion of boot up) based on a configuration (e.g., manufacture or factory setting). One or both of the host device 105 or the memory device 110 may store the one or more tracked temperature values associated with the memory device 110 to use for adjustment of the reference voltage value for the memory device 110 at a later time.

At 310, the sensor 305 may sense one or more temperature values associated with the memory device 110. In some examples, the sensor 305 may sense one or more temperature values associated with the memory device 110 (e.g., of the memory device 110, of one or more components of the memory device 110, of other temperatures related to the memory device) while the memory device 110 is operating in a boot-up mode. A boot-up mode may include one or more operations including powering the memory device 110 (or other components of the memory device 110) and loading instructions or code into the memory device 110 (or other components of the memory device 110) before executing the instructions or code. Additionally or alternatively, the sensor 305 may sense one or more temperature values associated with the memory device 110 while the memory device 110 is operating in a post boot-up mode. The post boot-up mode may include one or more operations after loading instructions or code into the memory device 110 (or other components of the memory device 110) including executing the instructions or code.

At 315-a, the sensor 305 may optionally output, to the memory device 110, the one or more temperature values associated with the memory device 110. In some examples, the sensor 305 may be internal to the memory device 110 (e.g., configured on the same integrated circuit, or the like). In some other examples, the sensor 305 may be external to the memory device 110 (e.g., configured on different integrated circuits, or the like). At 315-b, the sensor 305 may optionally output, to the host device 105, the one or more temperature values associated with the memory device 110. In some examples, the sensor 305 may be internal to the host device 105 (e.g., configured on the same integrated circuit, or the like). In some other examples, the sensor 305 may be external to the host device 105 (e.g., configured on different integrated circuits, or the like).

At 320, one or both of the host device 105 or the memory device 110 may select a reference voltage offset value for the memory device 110 based on mapping the temperature value associated with the memory device 110 to a relationship between reference voltage offset values and temperature differential values associated with the memory device 110. In some examples, one or both of the host device 105 or the memory device 110 may select a default reference voltage offset value for the memory device 110 and subsequently select another reference voltage offset value for the memory device 110, for example, based on additional temperature values associated with the memory device 110 (e g., obtained at a later time).

At 325, one or both of the host device 105 or the memory device 110 may adjust a reference voltage value associated with the memory device 110 based on the reference voltage offset value. In some examples, one or both of the host device 105 or the memory device 110 may adjust a default reference voltage value for the memory device 110 and subsequently select another reference voltage value for the memory device 110, for example, based on subsequent reference voltage offset value determination. One or both of the host device 105 or the memory device 110 may adjust the reference voltage value associated with the memory device 110 based on tracking the temperature value associated with the memory device 110 during the duration. For example, the memory device 110 may increase or decrease a reference voltage value to a respective reference voltage value in accordance with the reference voltage offset value. For example, the host device 105 may increase or decrease a reference voltage value to a respective reference voltage value in accordance with the reference voltage offset value. In some examples, one or both of the host device 105 or the memory device 110 may periodically adjust the reference voltage value associated with the memory device 110 based on tracking the temperature value associated with the memory device 110 during the duration. In some other examples, one or both of the host device 105 or the memory device 110 may semi-statically adjust the reference voltage value associated with the memory device 110 based on monitor a reference voltage value associated with the memory device 110 during one or both of a first phase of operation (e.g., a boot-up operation) or a second phase (e.g., a post boot-up operation).

One or both of the host device 105 or the memory device 110 may determine a first temperature value associated with the memory device 110 during the first phase of operation and a second temperature value associated with the memory device 110 during the second phase of operation. One or both of the host device 105 or the memory device 110 may map the temperature difference value to a set of reference voltage offset values and a set of temperature difference values. In some examples, the temperature difference value may correspond to one of the set of reference voltage offset values and one of the set of temperature difference values. In some examples, the temperature difference value may be based on a linear relationship between the reference voltage offset value, or the first temperature value, or the second temperature value, or any combination thereof. In some other examples, the temperature difference value may be based on a non-linear relationship between the reference voltage offset value, or the first temperature value, or the second temperature value, or any combination thereof. For example, a look-up table (LUT) may include reference voltage offset values and temperature differential values associated with one or both of the linear relationship or the non-linear relationship.

At 330, the memory device 110 may, buffer a reference voltage value to a respective reference voltage value in accordance with the reference voltage offset value. As described herein, the memory device 110 may be a PAM-4 transceiver, for example, which may include a number of pseudo-differential pre-amplifiers. In some examples, one or both of the host device 105 or the memory device 110 may select and adjust a respective reference voltage value for each respective pseudo-differential pre-amplifier associated with the PAM-4 transceiver. In some examples, one or both of the host device 105 or the memory device 110 may adjust the respective reference voltage value for each respective pseudo-differential pre-amplifier associated with the PAM-4 transceiver by increasing (e.g., buffering) the respective reference voltage value in accordance with the reference voltage offset value. Alternatively, one or both of the host device 105 or the memory device 110 may adjust the respective reference voltage value for each respective pseudo-differential pre-amplifier associated with the PAM-4 transceiver by decreasing (e.g., buffering) the respective reference voltage value in accordance with the reference voltage offset value.

By enabling one or both of the host device 105 or the memory device 110 to support tracking a temperature value associated with the memory device and adjusting a voltage reference value by a reference voltage offset value, the memory device 110 may experience improved voltage margins and efficient operations without impact to normal operation of the memory device 110.

Figure 4A:
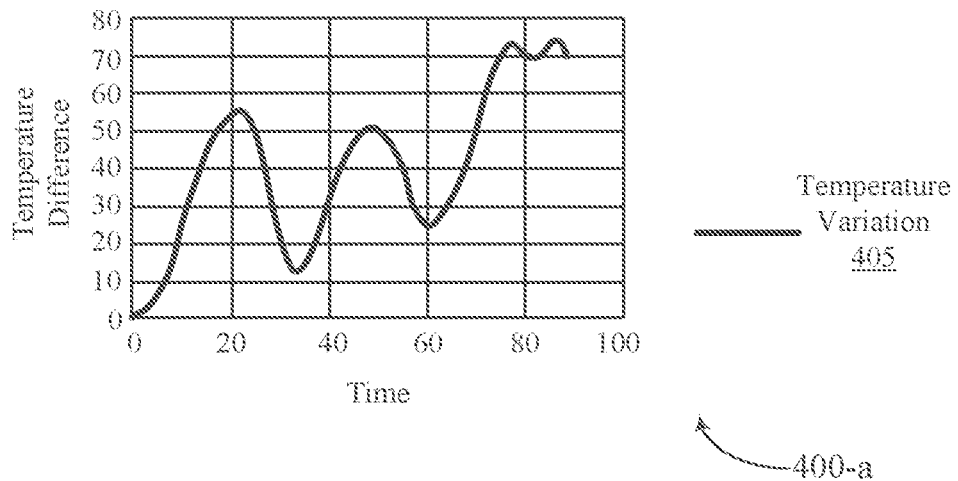
FIGS. 4A through 4C illustrates examples of graphs that support tracking a reference voltage after boot-up in accordance with examples as disclosed herein.

FIG. 4A illustrates an example of a graph 400-$a$ that supports tracking a reference voltage after boot-up in accordance with examples as disclosed herein. The graph 400-$a$ may implement aspects of the system 100 or may be implemented by aspects of the system 100 as described with reference to FIG. 1. For example, the graph 400-$a$ may illustrate a temperature behavior (e.g., a temperature difference) of a memory device 110 as described with reference to FIG. 1. Additionally or alternatively, the graph 400-$a$ may implement aspects of the memory die 200 or may be implemented by aspects of the memory die 200 as described with reference to FIG. 2. For example, the graph 400-$a$ may illustrate a temperature behavior (e g., a temperature difference) of the memory die 200. The memory die 200 may be an example of the memory dies 160 described with reference to FIG. 1. In some examples, the memory die 200 may be referred to as a memory chip, a memory device, or an electronic memory apparatus.

As described herein, a memory device 110 (or a memory die 200) may determine temperature values associated with the memory device 110 (or the memory die 200) over a timeframe. For example, the memory device 110 (or the memory die 200) may obtain temperature values associated with the memory device 110 (or the memory die 200) from a sensor coupled with the memory device 110 (or the memory die 200). The sensor may be an example of a temperature sensor configured to sense a temperature value of the memory device 110 (or a component of the memory device 110 such as the memory die 200) during a mode of operation of the memory device 110 (or a component of the memory device 110 such as or the memory die 200). The mode of operation may be a boot-up mode or a post boot-up mode. In the example of FIG. 4A, the memory device 110 (or the memory die 200) may track a temperature variation 405 (or discrete data points of temperature measurements over time) associated with the memory device 110 (or a component of the memory device 110 such as or the memory die 200) during a duration and while the memory device 110 (or a component of the memory device 110 such as or the memory die 200) is operating in one or more modes.

For example, an initial time $T_0$ may correspond to a boot-up mode associated with the memory device 110 (or a component of the memory device 110 such as or the memory die 200). The boot-up mode may also be referred to as a training mode, in which a reference voltage offset value and a temperature differential value associated with the memory device 110 (or a component of the memory device 110 such as or the memory die 200) may be set to a first value, such as zero. Subsequently, the memory device 110 (or a component of the memory device 110 such as or the memory die 200) may track temperature values associated with the memory device 110 (or a component of the memory device 110 such as or the memory die 200) during one or more subsequent times $T_n$. As illustrated in FIG. 4A, while the memory device 110 (or the memory die 200) is operating in one or more modes, the memory device 110 (or the memory die 200) may experience the temperature variation 405. Accordingly, the graph 400-$a$ illustrates the temperature variation 405 that may be associated with the memory device 110 (or a component of the memory device 110 such as or the memory die 200) when the memory device 110 (or the memory die 200) is operating in one or more modes (e.g., a boot-up mode, a post boot-up mode).

Figure 4B:
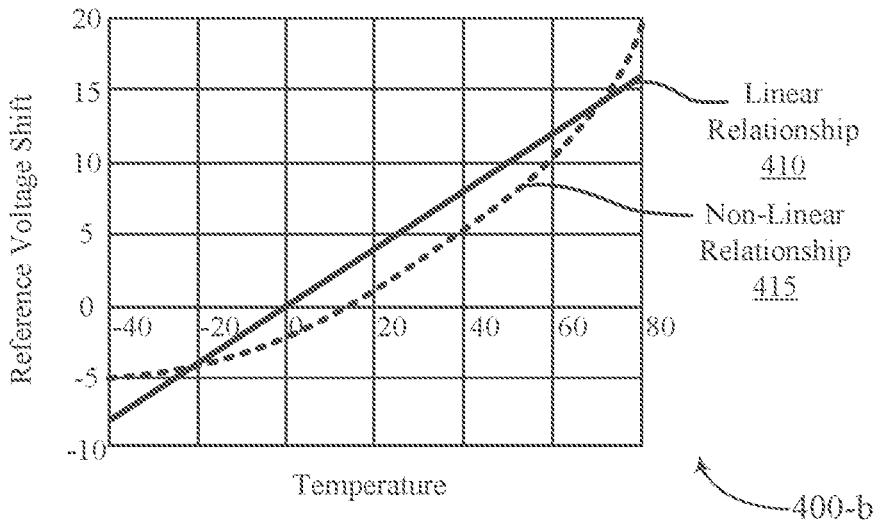

FIG. 4B illustrates an example of a graph 400-$b$ that supports tracking a reference voltage after boot-up in accordance with examples as disclosed herein. The graph 400-$b$ may implement aspects of the system 100 or may be implemented by aspects of the system 100 as described with reference to FIG. 1. For example, the graph 400-$b$ may illustrate a relationship between reference voltage offset values and temperature differential values of a memory device 110 as described with reference to FIG. 1. Additionally or alternatively, the graph 400-$b$ may implement aspects of the memory die 200 or may be implemented by aspects of the memory die 200 as described with reference to FIG. 2. For example, the graph 400-$b$ may illustrate a relationship between reference voltage offset values (also referred to as $V_{REFD}$-shift) and temperature differential values of the memory die 200. The memory die 200 may be an example of the memory dies 160 described with reference to FIG. 1. In some examples, the memory die 200 may be referred to as a memory chip, a memory device, or an electronic memory apparatus. As described herein, a memory device 110 (or a component of the memory device 110 such as or the memory die 200) may determine a temperature value associated with the memory device 110 (or a component of the memory device 110 such as or the memory die 200), and select a reference voltage offset value for the memory device 110 (or a component of the memory device 110 such as or the memory die 200) based on mapping the temperature value associated with the memory device 110 (or a component of the memory device 110 such as or the memory die 200) to a relationship between reference voltage offset values and temperature differential values associated with the memory device 110 (or a component of the memory device 110 such as or the memory die 200).

In the example of FIG. 4B, the relationship may be a linear relationship 410 between reference voltage offset values and temperature differential values associated with the memory device 110 (or a component of the memory device 110 such as or the memory die 200). A linear relationship is one in which two variables (e.g., reference voltage offset values and temperature differential values) have a direct proportional relationship. Put another way, if a value of a respective temperature differential value changes, a respective reference voltage offset value may also change with the same proportion. Alternatively, in the example of FIG. 4B, the relationship may be a non-linear relationship 415 between reference voltage offset values and temperature differential values associated with the memory device 110 (or a component of the memory device 110 such as or the memory die 200) A non-linear relationship is one in which a change to one variable (e.g., temperature differential values) does not correspond with a direct proportional change to another variable (e.g., reference voltage offset values). Put another way, if a value of a respective temperature differential value changes, a respective reference voltage offset value might not change with the same proportion.

The memory device 110 (or a component of the memory device 110 such as or the memory die 200) may be preconfigured with a LUT, which may include reference voltage offset values and temperature differential values associated with one or both of the linear relationship 410 or the non-linear relationship 415. In some examples, the LUT or other data structures corresponding to one or both of the linear relationship 410 or the non-linear relationship 415 may be pre-configured (e.g., factory set) on the memory device 110 (or a component of the memory device 110 such as or the memory die 200) or programmed by a controller in a system (e g., the external memory controller 120, the device memory controller 155, or the local memory controller 165 in the system 100, as described with reference to FIG. 1, or the local memory controller 260 as described with reference to FIG. 2). The LUT may include various information that maps each of one or more reference voltage offset values of a set of reference voltage offset values to each of one or more temperature differential values of a set of temperature differential values associated with the memory device 110 (or a component of the memory device 110 such as or the memory die 200). In some examples, each of the one or more temperature differential values of the set of temperature differential values associated with the memory device 110 (or a component of the memory device 110 such as or the memory die 200) correspond to a difference between a first temperature value associated with memory device 110 (or the memory die 200) during a first duration (e.g., a first sensing window) while operating in a first mode (e.g., a boot-up mode) and a second temperature value associated with the memory device 110 (or the memory die 200) during a second duration (e.g., a second sensing window) while operating in a second mode (e.g., a post boot-up mode).

Accordingly, the memory device 110 (or the memory die 200) may adjust a reference voltage value associated the memory device 110 (or a component of the memory device 110 such as or the memory die 200) based on selecting a reference voltage offset value associated with one or both of the linear relationship 410 or the non-linear relationship 415. Additionally, more complex dependencies (other than linear and non-linear) are also contemplated. The memory device 110 (or a component of the memory device 110 such as or the memory die 200) or a host device 105 as described with reference to FIG. 1 may support continuous (e.g., repeating) adjustment of a reference voltage value associated the memory device 110 (or the memory die 200) based on selecting a reference voltage offset value associated with one or both of the linear relationship 410 or the non-linear relationship 415. For example, the host device 105 may receive sensor information (e.g., temperature values) associated with the memory device 110 (or the memory die 200) and based on received sensor information, the host device 105 may select reference voltage offset value associated with one or both of the linear relationship 410 or the non-linear relationship 415. Subsequently, the host device 105 may send, via the external memory controller 120, a control signal to the memory device 110 (or a component of the memory device 110 such as the device memory controller 155) to adjust reference voltage value associated the memory device 110 (or a component of the memory device 110 such as or the memory die 200) in accordance with the reference voltage offset value.

Figure 4C:
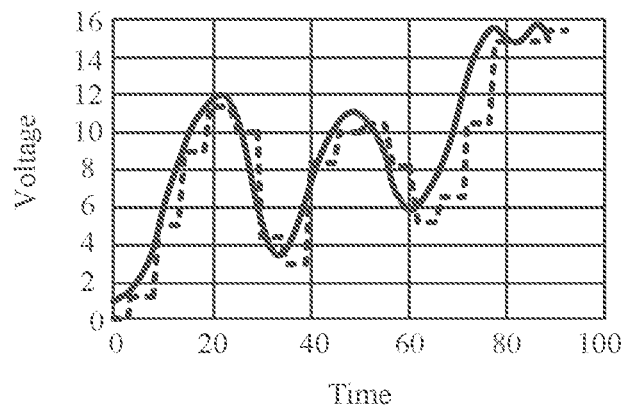

FIG. 4C illustrates an example of a graph 400-*c* that supports tracking a reference voltage after boot-up in accordance with examples as disclosed herein. The graph 400-*c* may implement aspects of the system 100 or may be implemented by aspects of the system 100 as described with reference to FIG. 1. For example, the graph 400-*c* mas illustrate a voltage behavior of a memory device 110 as described with reference to FIG. 1. Additionally or alternatively, the graph 400-*c* may implement aspects of the memory die 200 or may be implemented by aspects of the memory die 200 as described with reference to FIG. 2. For example, the graph 400-*c* may illustrate a voltage behavior of the memory die 200. The memory die 200 may be an example of the memory dies 160 described with reference to FIG. 1. In some examples, the memory die 200 may be referred to as a memory chip, a memory device, or an electronic memory apparatus.

As described herein, a memory device 110 (or a component of the memory device 110 such as or the memory die 200) may determine a temperature value associated with the memory device 110 (or a component of the memory device 110 such as or the memory die 200), and select a reference voltage offset value for the memory device 110 (or a component of the memory device 110 such as or the memory die 200) based on mapping the temperature value associated with the memory device 110 (or a component of the memory device 110 such as or the memory die 200) to a relationship between reference voltage offset values and temperature differential values associated with the memory device 110 (or a component of the memory device 110 such as or the memory die 200). In the example of FIG. 4C, the graphs 400-*c* illustrates an example, among others, of a preferred reference voltage value variation 420 for the memory device 110 (or a component of the memory device 110 such as or the memory die 200) and an approximate reference voltage value variation 425 for the memory device 110 (or a component of the memory device 110 such as or the memory die 200).

The memory device 110 (or a component of the memory device 110 such as or the memory die 200) may sense (or otherwise obtain) temperature values of the memory device 110 (or a component of the memory device 110 such as or the memory die 200) based on a sampling rate for sensing a temperature of the memory device 110 (or a component of the memory device 110 such as or the memory die 200). A sampling rate may correspond to a number of samples (e.g., temperature value samples) per time unit obtained by the memory device 110 (or a component of the memory device 110 such as or the memory die 200) or other aspects (e.g., a sensor) as described herein. In some examples, the memory device 110 (or a component of the memory device 110 such as or the memory die 200) may track, sense, or otherwise obtain temperature values of the memory device 110 (or a component of the memory device 110 such as or the memory die 200) periodically or aperiodically based on a configuration (e.g., a device-specific configuration or setting). The memory device 110 (or a component of the memory device 110 such as or the memory die 200) may determine the approximate reference voltage value variation 425 based on sensing (or otherwise obtaining from a sensor coupled with the memory device 110 (or a component of the memory device 110 such as or the memory die 200)) a temperature value of the memory device 110 (or a component of the memory device 110 such as or the memory die 200) during a timeframe (e.g., a sensing window) and adjusting a reference voltage value associated with the memory device 110 (or a component of the memory device 110 such as or the memory die 200) based on a relationship (e.g., the linear relationship 410 and/or the non-linear relationship 415 as described with reference to FIG. 4B) between reference voltage offset values and temperature differential values associated with the memory device 110 (or a component of the memory device 110 such as or the memory die 200).

By way of example, the memory device 110 (or the memory die 200) may periodically sense (or otherwise obtain from a sensor coupled with the memory device 110 (or a component of the memory device 110 such as or the memory die 200)) a temperature value of the memory device 110 (or a component of the memory device 110 such as or the memory die 200) every X time units, such as every 5 time units (e.g., milliseconds, seconds, or the like) and adjust a reference voltage value associated with the memory device 110 (or a component of the memory device 110 such as or the memory die 200) based on a relationship (e.g., the linear relationship 410 and/or the non-linear relationship 415 as described with reference to FIG. 4B) between reference voltage offset values and temperature differential values associated with the memory device 110 (or a component of the memory device 110 such as or the memory die 200). Similarly, the memory device 110 (or a component of the memory device 110 such as or the memory die 200) may periodically adjust the reference voltage value associated with the memory device 110 (or a component of the memory device 110 such as or the memory die 200) based on tracking the temperature value of the memory device 110 (or a component of the memory device 110 such as or the memory die 200) periodically. Alternatively, a host device 105 as described with reference to FIG. 1 may determine the approximate reference voltage value variation 425 based on sensing (or obtaining from a sensor coupled with the memory device 110 (or a component of the memory device 110 such as or the memory die 200)) a temperature value of the memory device 110 (or a component of the memory device 110 such as or the memory die 200) during a duration (e.g., every 5 time-units) as described herein.

In some examples, the memory device 110 (or the memory die 200) may one or more of sense (or obtain) a temperature value associated with the memory device 110 (or the memory die 200), select a reference voltage offset value for the memory device 110 based on mapping the temperature value associated with the memory device 110 to a relationship between reference voltage offset values and temperature differential values associated with the memory device 110, or adjust a reference voltage value associated with the memory device 110 based on the reference voltage offset value with varying time-units. For example, the memory device 110 (or the memory die 200) may perform one or more of the example operations (e.g., sense, obtain, select, adjust, and the like as described herein) based on a first periodicity (e g., every 5 milliseconds, seconds, or the like). Subsequently, the memory device 110 (or the memory die 200) may perform one or more of the example operations (e.g., sense, obtain, select, adjust, and the like as described herein) based on a second periodicity (e.g., every 3 milliseconds, seconds, or the like). The memory device 110 (or the memory die 200) may determine to increase or decrease the time-units associated with the example operations (e.g., sense, obtain, select, adjust, and the like as described herein) based on a condition (e.g., number of processes at the memory device 110, temperature changes between two occasions, and the like). For example, a temperature change between a first temperature value associated with the first periodicity and a second temperature value associated with the second periodicity may satisfy a threshold (e.g., below and/or above). Based on this determination, the memory device 110 (or the memory die 200) may determine to change the time-units, for example, to increase or decrease the periodicity.

In some examples, the memory device 110 (or a component of the memory device 110 such as or the memory die 200) may adjust a reference voltage value associated the memory device 110 (or a component of the memory device 110 such as or the memory die 200) based on selecting a reference voltage offset value (also referred to as reference voltage shift values (e g., $V_{REFD}$-shift)) that has a relationship as described with reference to FIG. 4B. The memory device 110 (or a component of the memory device 110 such as or the memory die 200) may sense, obtain, or determine a temperature value associated with the memory device 110 (or a component of the memory device 110 such as or the memory die 200) at or during a first duration. To (e.g., at an ending) of a training operation associated with the memory device 110 (or a component of the memory device 110 such as or the memory die 200). The memory device 110 (or a component of the memory device 110 such as or the memory die 200) may also sense, obtain, or determine a temperature value associated with the memory device 110 (or a component of the memory device 110 such as or the memory die 200) at or during a second duration $T_1$ (e.g., after the training operation) associated with the memory device 110 (or a component of the memory device 110 such as or the memory die 200). The memory device 110 (or a component of the memory device 110 such as or the memory die 200) may determine a difference between the temperature values sensed, obtained, or determined during the first duration. To and the second duration $T_1$. Based on the difference, the memory device 110 (or a component of the memory device 110 such as or the memory die 200) may determine and select a reference voltage offset value for the memory device 110 (or a component of the memory device 110 such as or the memory die 200).

Accordingly, the memory device 110 (or a component of the memory device 110 such as or the memory die 200) may reduce a voltage reference value error by tracking a temperature value associated with the memory device 110 (or a component of the memory device 110 such as or the memory die 200) and adjusting a voltage reference value based on a relationship (e.g., the linear relationship 410 and/or the non-linear relationship 415 as described with reference to FIG. 4B) between reference voltage offset values and temperature differential values associated with the memory device 110 (or a component of the memory device 110 such as or the memory die 200). By enabling the memory device 110 (or a component of the memory device 110 such as or the memory die 200) to support tracking a temperature value associated with the memory device 110 (or a component of the memory device 110 such as or the memory die 200) and adjusting a voltage reference value by a reference voltage offset value dependent on a relationship (e.g., the linear relationship 410 and/or the non-linear relationship 415 as described with reference to FIG. 4B), the memory device 110 (or a component of the memory device 110 such as or the memory die 200) may experience efficient operations without impact to normal operation (e.g., during post boot-up operation) of the memory device 110 (or a component of the memory device 110 such as or the memory die 200).

Additionally, the tracking of the temperature value associated with the memory device 110 (or a component of the memory device 110 such as or the memory die 200) and adjusting of the voltage reference value associated with the memory device 110 (or a component of the memory device 110 such as or the memory die 200)) may occur as a background process at the memory device 110 (or a component of the memory device 110 such as or the memory die 200) or the host device 105. A background process may be a process that executes without user intervention at the memory device 110 (or a component of the memory device 110 such as or the memory die 200), or host device 105. The memory device 110 (or a component of the memory device 110 such as or the memory die 200) or the host device 105 may also support the adjustment of a reference voltage value associated the memory dev ice 110 (or a component of the memory device 110 such as or the memory die 200) concurrently with other operations (e.g., activities) including write-access operations occurring at the memory device 110 (or a component of the memory device 110 such as or the memory die 200).

By enabling the memory device 110 (or the memory die 200) or the host device 105 to support tracking of the temperature value associated with the memory device 110 (or a component of the memory device 110 such as or the memory die 200), the memory device 110 (or a component of the memory device 110 such as or the memory die 200), or the host device 105 may increase or decrease a voltage reference value associated with the memory device 110 (or a component of the memory device 110 such as or the memory die 200) by a voltage reference offset value as described herein and as illustrated with reference to FIG. 4C.

Figure 5:
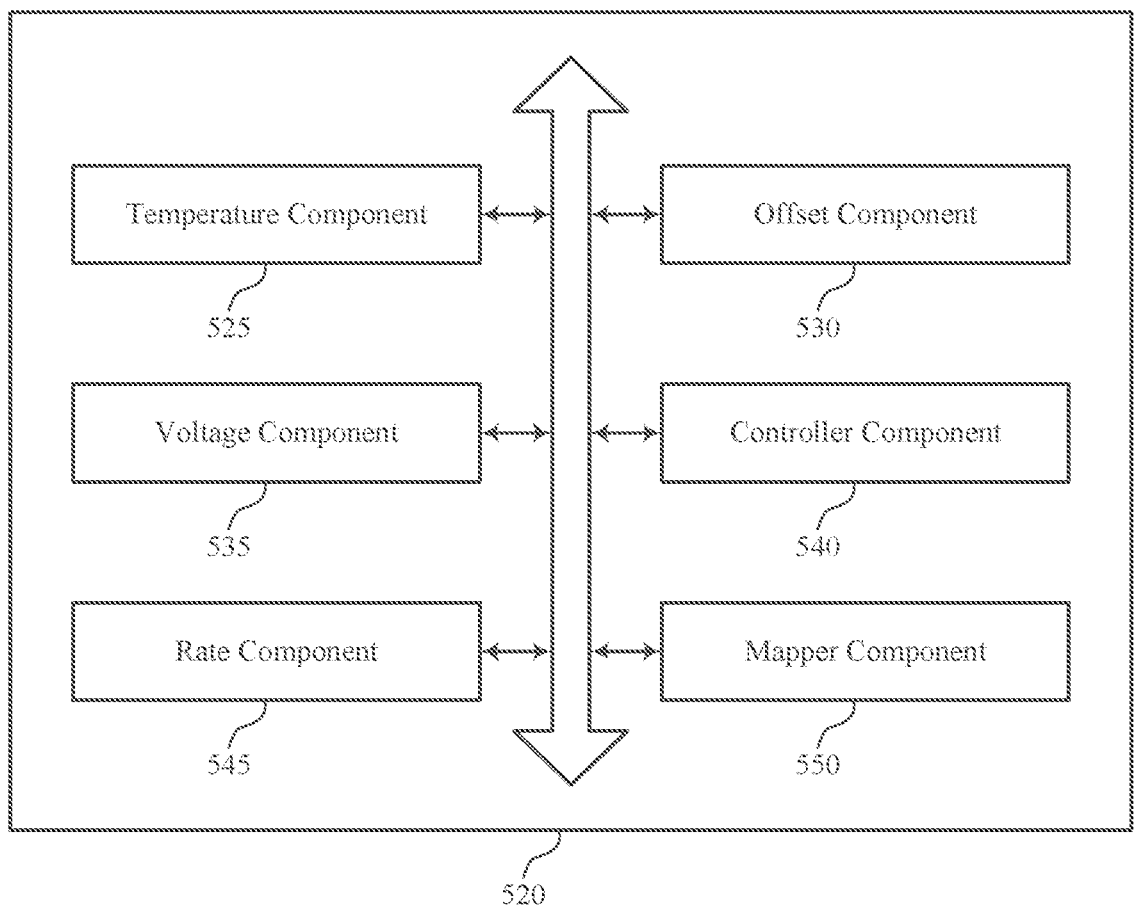
FIG. 5 shows a block diagram of a tracking component that supports tracking a reference voltage after boot-up in accordance with examples as disclosed herein.

FIG. 5 shows a block diagram 500 of a tracker component 520 that supports tracking a reference voltage after boot-up in accordance with examples as disclosed herein. The tracker component 520 may be an example of aspects of a host device 105 or a memory device 110, or both, as described herein. In some examples, the tracker component 520 may be an example of a processor of the host device 105 or the memory device 110. The tracker component 520, or various components thereof, may be an example of means for performing various aspects of tracking a reference voltage after boot-up as described herein. For example, the tracker component 520 may include a temperature component 525, an offset component 530, a voltage component 535, a controller component 540, a rate component 545, a mapper component 550, or any combination thereof. Each of these components may communicate, directly or indirectly, with one another (e.g., via one or more buses).

The temperature component 525 may be configured as or otherwise support a means for determining a temperature value associated with a memory device. The offset component 530 may be configured as or otherwise support a means for selecting a reference voltage offset value for the memory device based at least in part on mapping the temperature value associated with the memory device to a relationship between reference voltage offset values and temperature differential values associated with the memory device. The voltage component 535 may be configured as or otherwise support a means for adjusting a reference voltage value associated with the memory device based at least in part on the reference voltage offset value. The controller component 540 may be configured as or otherwise support a means for operating the memory device in accordance with the reference voltage value based at least in part on adjusting the reference voltage value.

In some examples, the temperature component 525 may be configured as or otherwise support a means for tracking the temperature value associated with the memory device during a duration based at least in part on a configuration. In some examples, the voltage component 535 may be configured as or otherwise support a means for adjusting the reference voltage value associated with the memory device based at least in part on tracking the temperature value associated with the memory device during the duration. In some examples, the voltage component 535 may be configured as or otherwise support a means for periodically adjusting the reference voltage value associated with the memory device based at least in part on tracking the temperature value associated with the memory device during the duration. In some examples, the voltage component 535 may be configured as or otherwise support a means for adjusting the reference voltage value associated with the memory device based at least in part on periodically adjusting the reference voltage value.

In some examples, the rate component 545 may be configured as or otherwise support a means for determining a sampling rate for sensing a temperature of the memory device based at least in part on a configuration. In some examples, the temperature component 525 may be configured as or otherwise support a means for determining the temperature value associated with the memory device based at least in part on the sampling rate. In some examples, to support adjusting the reference voltage value, the voltage component 535 may be configured as or otherwise support a means for increasing the reference voltage value to a respective reference voltage value in accordance with the reference voltage offset value. In some examples, to support adjusting the reference voltage value, the voltage component 535 may be configured as or otherwise support a means for decreasing the reference voltage value to a respective reference voltage value in accordance with the reference voltage offset value.

In some examples, the relationship corresponds to a look-up table including a plurality of reference voltage offset values and a plurality of temperature differential values. In some examples, the relationship includes a linear model mapping each of one or more reference voltage offset values of a plurality of reference voltage offset values to each of one or more temperature differential values of a plurality of temperature differential values associated with the memory device. In some examples, each of the one or more temperature differential values of the plurality of temperature differential values associated with the memory device correspond to a difference between a first temperature value associated with the memory device during a first duration while operating in a first mode and a second temperature value associated with the memory device during a second duration while operating in a second mode. In some examples, the first mode includes a boot-up mode and the second mode includes a post boot-up mode.

In some examples, to support determining the temperature value, the temperature component 525 may be configured as or otherwise support a means for determining the temperature value associated with the memory device during a first duration, the first duration occurring after a training operation associated with the memory device, the method further including. In some examples, to support determining the temperature value, the temperature component 525 may be configured as or otherwise support a means for determining a second temperature value associated with the memory device during a second duration preceding the first duration and occurring during the training operation. In some examples, to support determining the temperature value, the temperature component 525 may be configured as or otherwise support a means for determining a difference between the temperature value and the second temperature value. In some examples, to support determining the temperature value, the offset component 530 may be configured as or otherwise support a means for selecting the reference voltage offset value for the memory device based at least in part on the difference between the temperature value and the second temperature value. In some examples, the mapping is preconfigured at a device including the memory device. In some examples, the memory device includes a PAM4 receiver.

In some examples, the temperature component 525 may be configured as or otherwise support a means for determining a first temperature value associated with a memory device during a first phase of operation of the memory device. In some examples, the temperature component 525 may be configured as or otherwise support a means for determining a second temperature value associated with the memory device during a second phase of operation of the memory device different than the first phase of operation. In some examples, the offset component 530 may be configured as or otherwise support a means for selecting a reference voltage offset value for the memory dev ice based at least in part on a temperature difference value between the first temperature value and the second temperature value. In some examples, the voltage component 535 may be configured as or otherwise support a means for adjusting a reference voltage value associated with the memory device based at least in part on the reference voltage offset value. In some examples, the controller component 540 may be configured as or otherwise support a means for operating the memory device in accordance with the reference voltage value based at least in part on adjusting the reference voltage value.

In some examples, the temperature difference value is based at least in part on a linear relationship between the reference voltage offset value, the first temperature value, the second temperature value, or any combination thereof. In some examples, the temperature difference value is based at least in part on a non-linear relationship between the reference voltage offset value, the first temperature value, the second temperature value, or any combination thereof. In some examples, to support selecting the reference voltage offset value, the mapper component 550 may be configured as or otherwise support a means for mapping the temperature difference value to a plurality of reference voltage offset values and a plurality of temperature difference values, where the temperature difference value corresponds to one of the plurality of reference voltage offset values and one of the plurality of temperature difference values.

In some examples, the voltage component 535 may be configured as or otherwise support a means for monitoring the reference voltage value associated with the memory device during one or both of the first phase of operation or the second phase of operation based at least in part on a configuration. In some examples, the voltage component 535 may be configured as or otherwise support a means for adjusting the reference voltage value based at least in part on monitoring the reference voltage value associated with the memory device during one or both of the first phase of operation or the second phase of operation.

In some examples, the voltage component 535 may be configured as or otherwise support a means for semi-statically controlling the reference voltage value associated with the memory device based at least in part on the monitoring. In some examples, the voltage component 535 may be configured as or otherwise support a means for adjusting the reference voltage value based at least in part on semi-statically controlling the reference voltage value. In some examples, to support adjusting the reference voltage value, the voltage component 535 may be configured as or otherwise support a means for buffering the reference voltage value to a respective reference voltage value by increasing the reference voltage value by the reference voltage offset value. In some examples, to support adjusting the reference voltage value, the voltage component 535 may be configured as or otherwise support a means for buffering the reference voltage value to a respective reference voltage value by decreasing the reference voltage value by the reference voltage offset value.

Figure 6:
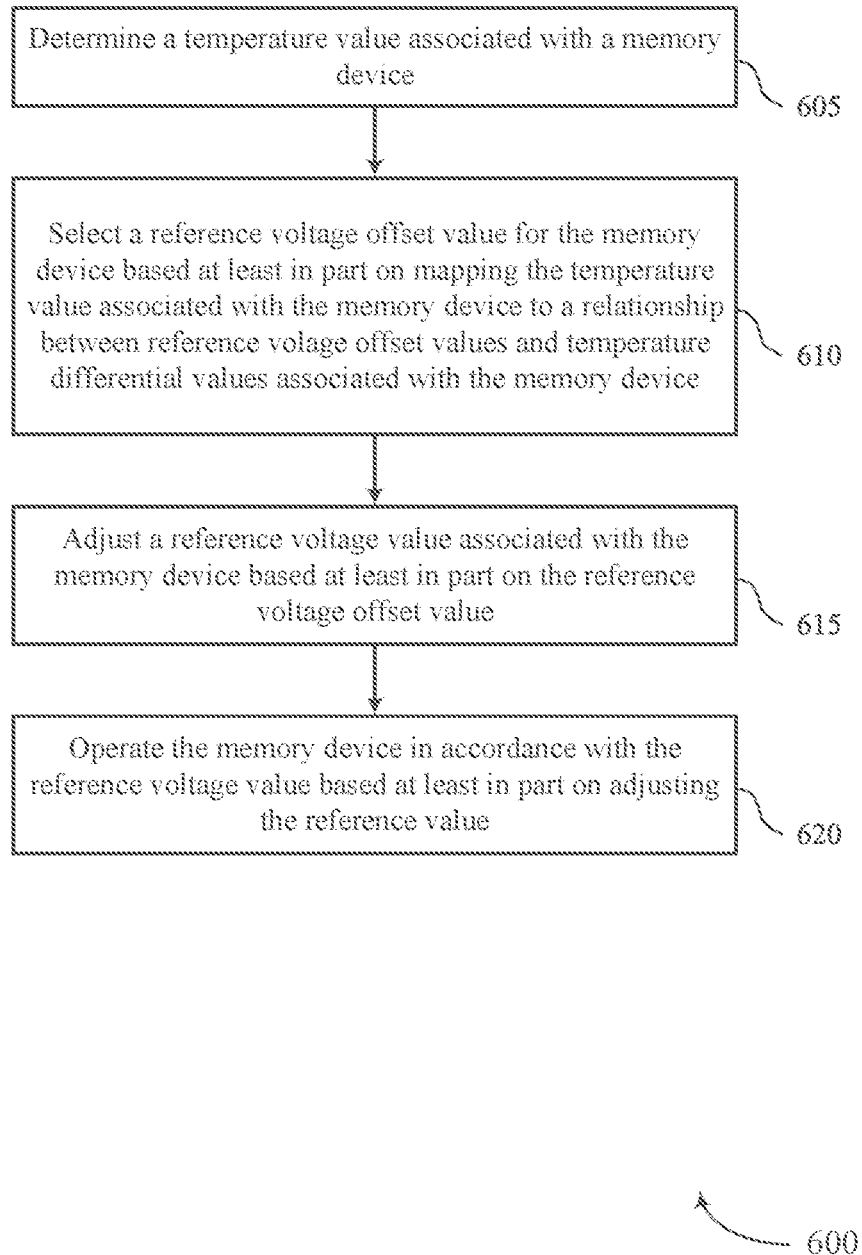
FIGS. 6 and 7 show flowcharts illustrating a method or methods that support tracking a reference voltage after boot-up in accordance with examples as disclosed herein.

FIG. 6 shows a flowchart illustrating a method 600 that supports tracking a reference voltage after boot-up in accordance with examples as disclosed herein. The operations of method 600 may be implemented by a host device 105 or a memory device 110 or components thereof as described herein. For example, the operations of method 600 may be performed by the host device 105 or the memory device 110 as described with reference to FIGS. 1 through 5. In some examples, a host device 105 or a memory device 110 may execute a set of instructions to control the functional elements of the host device 105 or the memory device 110 to perform the described functions. Additionally, or alternatively, the host device 105 or the memory device 110 may perform aspects of the described functions using special-purpose hardware.

At 605, the method may include determining a temperature value associated with a memory device. The operations of 605 may be performed in accordance with examples as disclosed herein. In some examples, aspects of the operations of 605 may be performed by a temperature component 525 as described with reference to FIG. 5.

At 610, the method may include selecting a reference voltage offset value for the memory device based at least in part on mapping the temperature value associated with the memory dev ice to a relationship between reference voltage offset values and temperature differential values associated with the memory device. The operations of 610 may be performed in accordance with examples as disclosed herein. In some examples, aspects of the operations of 610 may be performed by an offset component 530 as described with reference to FIG. 5.

At 615, the method may include adjusting a reference voltage value associated with the memory device based at least in part on the reference voltage offset value. The operations of 615 may be performed in accordance with examples as disclosed herein. In some examples, aspects of the operations of 615 may be performed by a voltage component 535 as described with reference to FIG. 5.

At 620, the method may include operating the memory device in accordance with the reference voltage value based at least in part on adjusting the reference voltage value. The operations of 620 may be performed in accordance with examples as disclosed herein. In some examples, aspects of the operations of 620 may be performed by a controller component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining a temperature value associated with a memory device; selecting a reference voltage offset value for the memory device based at least in part on mapping the temperature value associated with the memory device to a relationship between reference voltage offset values and temperature differential values associated with the memory device; adjusting a reference voltage value associated with the memory device based at least in part on the reference voltage offset value, and operating the memory device in accordance with the reference voltage value based at least in part on adjusting the reference voltage value.

Aspect 2 The method, apparatus, or non-transitory computer-readable medium of aspect 1, further including operations, features, circuitry, logic, means, or instructions, or any combination thereof for tracking the temperature value associated with the memory device during a duration based at least in part on a configuration and where adjusting the reference voltage value associated with the memory device is based at least in part on tracking the temperature value associated with the memory device during the duration.

Aspect 3: The method, apparatus, or non-transitory computer-readable medium of aspect 2, further including operations, features, circuitry, logic, means, or instructions, or any combination thereof for periodically adjusting the reference voltage value associated with the memory device based at least in part on tracking the temperature value associated with the memory device during the duration and where adjusting the reference voltage value associated with the memory device is based at least in part on periodically adjusting the reference voltage value.

Aspect 4: The method, apparatus, or non-transitory computer-readable medium of any of aspects 1 through 3, further including operations, features, circuitry, logic, means, or instructions, or any combination thereof for determining a sampling rate for sensing a temperature of the memory device based at least in part on a configuration and where determining the temperature value associated with the memory device is based at least in part on the sampling rate.

Aspect 5: The method, apparatus, or non-transitory computer-readable medium of any of aspects 1 through 4 where adjusting the reference voltage value includes operations, features, circuitry, logic, means, or instructions, or any combination thereof for increasing the reference voltage value to a respective reference voltage value in accordance with the reference voltage offset value.

Aspect 6. The method, apparatus, or non-transitory computer-readable medium of any of aspects 1 through 5 where adjusting the reference voltage value includes operations, features, circuitry, logic, means, or instructions, or any combination thereof for decreasing the reference voltage value to a respective reference voltage value in accordance with the reference voltage offset value.

Aspect 7 The method, apparatus, or non-transitory computer-readable medium of any of aspects 1 through 6 where the relationship corresponds to a look-up table including a plurality of reference voltage offset values and a plurality of temperature differential values.

Aspect 8: The method, apparatus, or non-transitory computer-readable medium of any of aspects 1 through 7 where the relationship includes a linear model mapping each of one or more reference voltage offset values of a plurality of reference voltage offset values to each of one or more temperature differential values of a plurality of temperature differential values associated with the memory device.

Aspect 9 The method, apparatus, or non-transitory computer-readable medium of aspect 8 where each of the one or more temperature differential values of the plurality of temperature differential values associated with the memory device correspond to a difference between a first temperature value associated with the memory device during a first duration while operating in a first mode and a second temperature value associated with the memory device during a second duration while operating in a second mode.

Aspect 10: The method, apparatus, or non-transitory computer-readable medium of aspect 9 where the first mode includes a boot-up mode and the second mode includes a post boot-up mode.

Aspect 11: The method, apparatus, or non-transitory computer-readable medium of any of aspects 1 through 10 where determining the temperature value includes operations, features, circuitry, logic, means, or instructions, or any combination thereof for determining the temperature value associated with the memory device during a first duration, the first duration occurring after a training operation associated with the memory device, the method further including: determining a second temperature value associated with the memory device during a second duration preceding the first duration and occurring during the training operation; determining a difference between the temperature value and the second temperature value; and where selecting the reference voltage offset value for the memory device is based at least in part on the difference between the temperature value and the second temperature value.

Aspect 12: The method, apparatus, or non-transitory computer-readable medium of any of aspects 1 through 11 where the mapping is preconfigured at a device including the memory device.

Aspect 13: The method, apparatus, or non-transitory computer-readable medium of any of aspects 1 through 12 where the memory device includes a four-level pulse amplitude modulation receiver.

Figure 7:
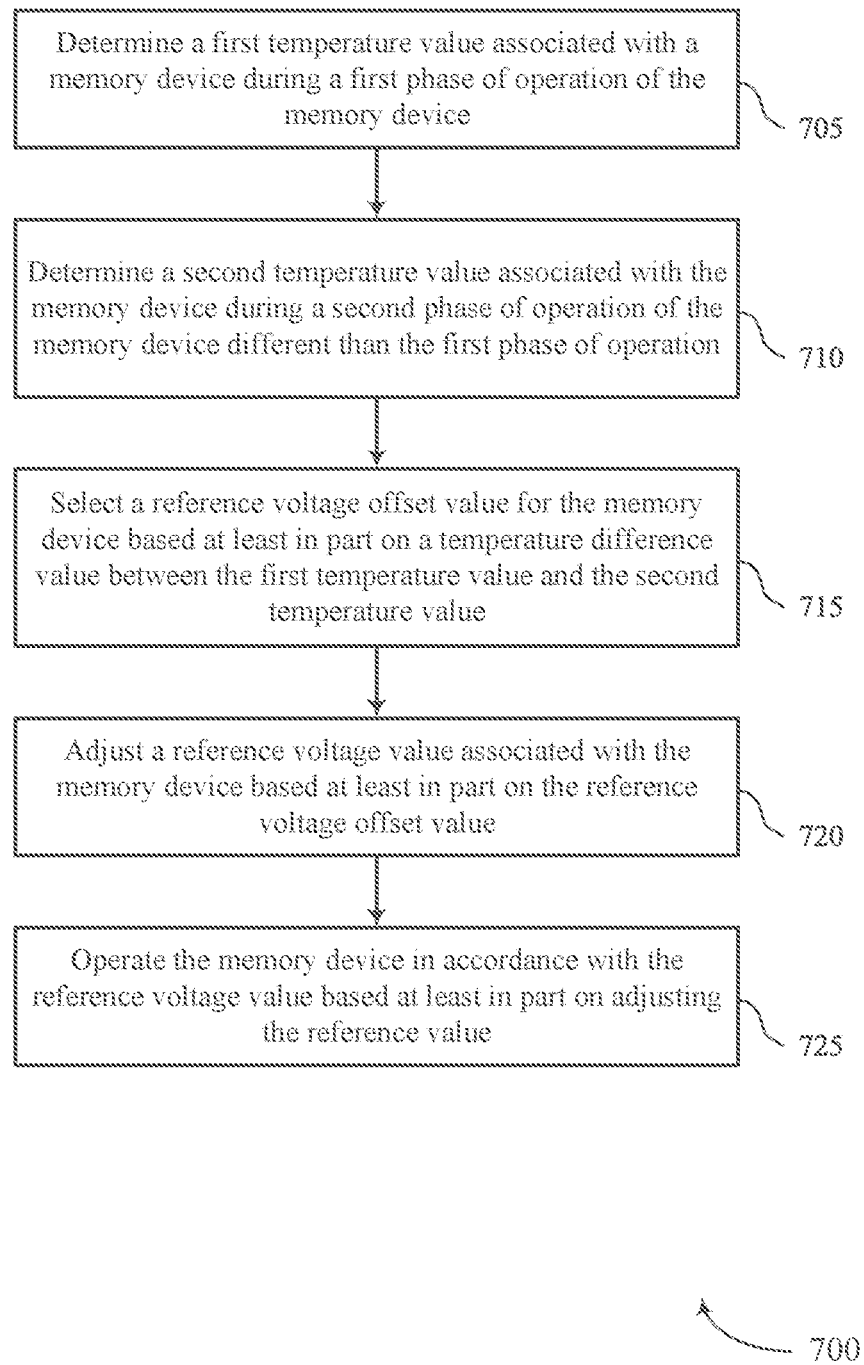

FIG. 7 shows a flowchart illustrating a method 700 that supports tracking a reference voltage after boot-up in accordance with examples as disclosed herein. The operations of method 700 may be implemented by a host device 105 or a memory device 110 or components thereof as described herein. For example, the operations of method 700 may be performed by the host device 105 or the memory device 110 as described with reference to FIGS. 1 through 5. In some examples, a host device 105 or a memory device 110 may execute a set of instructions to control the functional elements of the host device 105 or the memory device 110 to perform the described functions. Additionally, or alternatively, the host device 105 or the memory device 110 may perform aspects of the described functions using special-purpose hardware.

At 705, the method may include determining a first temperature value associated with a memory device during a first phase of operation of the memory device. The operations of 705 may be performed in accordance with examples as disclosed herein. In some examples, aspects of the operations of 705 may be performed by a temperature component 525 as described with reference to FIG. 5.

At 710, the method may include determining a second temperature value associated with the memory device during a second phase of operation of the memory device different than the first phase of operation. The operations of 710 may be performed in accordance with examples as disclosed herein. In some examples, aspects of the operations of 710 may be performed by a temperature component 525 as described with reference to FIG. 5.

At 715, the method may include selecting a reference voltage offset value for the memory device based at least in part on a temperature difference value between the first temperature value and the second temperature value. The operations of 715 may be performed in accordance with examples as disclosed herein. In some examples, aspects of the operations of 715 may be performed by an offset component 530 as described with reference to FIG. 5.

At 720, the method may include adjusting a reference voltage value associated with the memory device based at least in part on the reference voltage offset value. The operations of 720 may be performed in accordance with examples as disclosed herein. In some examples, aspects of the operations of 720 may be performed by a voltage component 535 as described with reference to FIG. 5.

At 725, the method may include operating the memory device in accordance with the reference voltage value based at least in part on adjusting the reference voltage value. The operations of 725 may be performed in accordance with examples as disclosed herein. In some examples, aspects of the operations of 725 may be performed by a controller component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for determining a first temperature value associated with a memory device during a first phase of operation of the memory device; determining a second temperature value associated with the memory device during a second phase of operation of the memory device different than the first phase of operation, selecting a reference voltage offset value for the memory device based at least in part on a temperature difference value between the first temperature value and the second temperature value; adjusting a reference voltage value associated with the memory device based at least in part on the reference voltage offset value; and operating the memory device in accordance with the reference voltage value based at least in part on adjusting the reference voltage value.

Aspect 15: The method, apparatus, or non-transitory computer-readable medium of aspect 14 where the temperature difference value is based at least in part on a linear relationship between the reference voltage offset value, the first temperature value, the second temperature value, or any combination thereof.

Aspect 16: The method, apparatus, or non-transitory computer-readable medium of any of aspects 14 through 15 where the temperature difference value is based at least in part on a non-linear relationship between the reference voltage offset value, the first temperature value, the second temperature value, or any combination thereof.

Aspect 17: The method, apparatus, or non-transitory computer-readable medium of any of aspects 14 through 16 where selecting the reference voltage offset value includes operations, features, circuitry, logic, means, or instructions, or any combination thereof for mapping the temperature difference value to a plurality of reference voltage offset values and a plurality of temperature difference values, where the temperature difference value corresponds to one of the plurality of reference voltage offset values and one of the plurality of temperature difference values.

Aspect 18: The method, apparatus, or non-transitory computer-readable medium of any of aspects 14 through 17, further including operations, features, circuitry, logic, means, or instructions, or any combination thereof for monitoring the reference voltage value associated with the memory device during one or both of the first phase of operation or the second phase of operation based at least in part on a configuration and where adjusting the reference voltage value is based at least in part on monitoring the reference voltage value associated with the memory device during one or both of the first phase of operation or the second phase of operation.

Aspect 19: The method, apparatus, or non-transitory computer-readable medium of aspect 18, further including operations, features, circuitry, logic, means, or instructions, or any combination thereof for semi-statically controlling the reference voltage value associated with the memory device based at least in part on the monitoring and where adjusting the reference voltage value is based at least in part on semi-statically controlling the reference voltage value.

Aspect 20: The method, apparatus, or non-transitory computer-readable medium of any of aspects 14 through 19 where adjusting the reference voltage value includes operations, features, circuitry, logic, means, or instructions, or any combination thereof for buffering the reference voltage value to a respective reference voltage value by increasing the reference voltage value by the reference voltage offset value.

Aspect 21: The method, apparatus, or non-transitory computer-readable medium of any of aspects 14 through 20 where adjusting the reference voltage value includes operations, features, circuitry, logic, means, or instructions, or any combination thereof for buffering the reference voltage value to a respective reference voltage value by decreasing the reference voltage value by the reference voltage offset value.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: An apparatus, including: a memory array, and a controller coupled with the memory array and configured to: determine a temperature value associated with the apparatus; select a reference voltage offset value for the apparatus based at least in part on mapping the temperature value associated with the apparatus to a relationship between reference voltage offset values and temperature differential values associated with the apparatus; adjust a reference voltage value associated with the apparatus based at least in part on the reference voltage offset value, and operate the apparatus in accordance with the reference voltage value based at least in part on adjusting the reference voltage value.

Aspect 23: The apparatus of aspect 22, where the controller is further configured to: track the temperature value associated with the apparatus during a duration based at least in part on a configuration, where to adjust the reference voltage value associated with the apparatus is based at least in part on tracking the temperature value associated with the memory device during the duration.

Aspect 24: The apparatus of aspect 23, where the controller is further configured to: periodically adjust the reference voltage value associated with the apparatus based at least in part on the tracking, where to adjust the reference voltage value associated with the apparatus is based at least in part on periodically adjusting the reference voltage value.

Aspect 25: The apparatus of any of aspects 22 through 24, where the controller is further configured to: determine a sampling rate for sensing a temperature of the apparatus based at least in part on a configuration, where to determine the temperature value associated with the apparatus is based at least in part on the sampling rate.

Aspect 26: The apparatus of any of aspects 22 through 25, where, to adjust the reference voltage value, the controller is configured to, increase the reference voltage value to a respective reference voltage value in accordance with the reference voltage offset value.

Aspect 27: The apparatus of any of aspects 22 through 26, where, to adjust the reference voltage value, the controller is configured to: decrease the reference voltage value to a respective reference voltage value in accordance with the reference voltage offset value.

An apparatus is described. The following provides an overview of aspects of the apparatus as described herein:

Aspect 28: An apparatus, including: a memory array; and a controller coupled with the memory array and configured to: determine a first temperature value associated with the apparatus during a first phase of operation of the apparatus, determine a second temperature value associated with the apparatus during a second phase of operation of the apparatus different than the first phase of operation; select a reference voltage offset value for the apparatus based at least in part on a temperature difference value between the first temperature value and the second temperature value; adjust a reference voltage value associated with the apparatus based at least in part on the reference voltage offset value; and operate the apparatus in accordance with the reference voltage value based at least in part on adjusting the reference voltage value.

Aspect 29: The apparatus of aspect 28, where the temperature difference value based at least in part on a linear relationship between the reference voltage offset value, the first temperature value, the second temperature value, or any combination thereof.

Aspect 30: The apparatus of any of aspects 28 through 29, where the temperature difference value based at least in part on a non-linear relationship between the reference voltage offset value, the first temperature value, the second temperature value, or any combination thereof.

Aspect 31: The apparatus of any of aspects 28 through 30, where, to select the reference voltage offset value, the controller is configured to: map the temperature difference value to a plurality of reference voltage offset values and a plurality of temperature difference values, where the temperature difference value corresponds to one of the plurality of reference voltage offset values and one of the plurality of temperature difference values.

Aspect 32: The apparatus of any of aspects 28 through 31, where the controller is further configured to: monitor the reference voltage value associated with the apparatus during one or both of the first phase of operation or the second phase of operation based at least in part on a configuration, where to adjust the reference voltage value is based at least in part on monitor the reference voltage value associated with the apparatus during one or both of the first phase of operation or the second phase of operation.

Aspect 33: The apparatus of aspect 32, where the controller is further configured to: semi-statically adjust the reference voltage value associated with the apparatus based at least in part on the monitoring, where to adjust the reference voltage value is based at least in part on semi-statically adjusting the reference voltage value.

Aspect 34: The apparatus of any of aspects 28 through 33, where, to update the reference voltage value, the controller is configured to: buffer the reference voltage value to a respective reference voltage value by increasing the reference voltage value by the reference voltage offset value.

An apparatus is described. The following provides an overview of aspects of the apparatus as described herein:

Aspect 35: An apparatus, including: a pulse amplitude modulation receiver including a set of amplifiers, each amplifier of the set of amplifiers including a respective reference voltage value input; a sensor coupled with the receiver and configured to sense a temperature value associated with the receiver; and a controller coupled with the receiver and the sensor, the controller configured to: determine a respective reference voltage offset value for each of one or more amplifiers of the set of amplifiers of the receiver based at least in part on mapping the sensed temperature value associated with the receiver to a relationship between reference voltage offset values and temperature differential values associated with the receiver; adjust a respective reference voltage value for each of the one or more amplifiers of the set of amplifiers of the receiver based at least in part on the respective reference voltage offset value for each of one or more amplifiers of the set of amplifiers of the receiver; and operate the receiver in accordance with the respective reference voltage value for each of the one or more amplifiers of the set of amplifiers of the receiver.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact." "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims. "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    determining a first temperature value associated with a first mode of operation of a memory device;
    selecting a reference voltage offset value for the memory device based at least in part on mapping the first temperature value associated with the memory device to a relationship between reference voltage offset values and a plurality of temperature differential values associated with the memory device, wherein at least one temperature differential value of the plurality of temperature differential values associated with the memory device corresponds to a difference between the first temperature value and a second temperature value associated with a second mode of operation of the memory device;
    adjusting a reference voltage value associated with the memory device based at least in part on the reference voltage offset value; and
    operating the memory device in accordance with the reference voltage value based at least in part on adjusting the reference voltage value.

2. The method of claim 1, further comprising:
    tracking the first temperature value associated with the memory device during a duration based at least in part on a configuration,
    wherein adjusting the reference voltage value associated with the memory device is based at least in part on tracking the first temperature value associated with the memory device during the duration.

3. The method of claim 2, further comprising:
    periodically adjusting the reference voltage value associated with the memory device based at least in part on tracking the first temperature value associated with the memory device during the duration,
    wherein adjusting the reference voltage value associated with the memory device is based at least in part on periodically adjusting the reference voltage value.

4. The method of claim 1, further comprising:
    determining a sampling rate for sensing a temperature of the memory device based at least in part on a configuration,
    wherein determining the first temperature value associated with the memory device is based at least in part on the sampling rate.

5. The method of claim 1, wherein adjusting the reference voltage value comprises:
    increasing the reference voltage value to a respective reference voltage value in accordance with the reference voltage offset value.

6. The method of claim 1, wherein adjusting the reference voltage value comprises:
    decreasing the reference voltage value to a respective reference voltage value in accordance with the reference voltage offset value.

7. The method of claim 1, wherein the relationship corresponds to a look-up table comprising a plurality of reference voltage offset values and the plurality of temperature differential values.

8. The method of claim 1, wherein the relationship comprises a linear model mapping each of one or more reference voltage offset values of a plurality of reference voltage offset values to each of one or more temperature differential values of the plurality of temperature differential values associated with the memory device.

9. The method of claim 8, wherein each of the one or more temperature differential values of the plurality of temperature differential values associated with the memory device correspond to a respective difference between an initial temperature value associated with the memory device during a first duration while operating in the first mode and a subsequent temperature value associated with the memory device during a second duration while operating in the second mode.

10. The method of claim 9, wherein the first mode comprises a boot-up mode and the second mode comprises a post boot-up mode.

11. The method of claim 1, wherein a first duration occurs after a training operation associated with the memory device, the method further comprising:
    determining the second temperature value associated with the memory device during a second duration preceding the first duration and occurring during the training operation; and
    determining the difference between the first temperature value and the second temperature value,
    wherein selecting the reference voltage offset value for the memory device is based at least in part on the difference between the first temperature value and the second temperature value.

12. The method of claim 1, wherein the mapping is pre-configured at a device comprising the memory device.

13. The method of claim 1, wherein the memory device comprises a four-level pulse amplitude modulation receiver.

14. A memory system, comprising:
one or more memory arrays; and
processing circuitry coupled with the one or more memory arrays and configured to cause the memory system to:
  determine a first temperature value associated with a first mode of operation of a memory device;
  select a reference voltage offset value for the memory device based at least in part on mapping the first temperature value associated with the memory device to a relationship between reference voltage offset values and a plurality of temperature differential values associated with the memory device, wherein at least one temperature differential value of the plurality of temperature differential values associated with the memory device corresponds to a difference between the first temperature value and a second temperature value associated a second mode of operation of the memory device;
  adjust a reference voltage value associated with the memory system based at least in part on the reference voltage offset value; and
  operate the memory system in accordance with the reference voltage value based at least in part on adjusting the reference voltage value.

15. The memory system of claim 14, wherein the processing circuitry is further configured to cause the memory system to:
  track the first temperature value associated with the memory system during a duration based at least in part on a configuration,
  wherein adjusting the reference voltage value associated with the memory system is based at least in part on tracking the first temperature value associated with the memory system during the duration.

16. The memory system of claim 15, wherein the processing circuitry is further configured to cause the memory system to:
  periodically adjust the reference voltage value associated with the memory system based at least in part on the tracking,
  wherein adjusting the reference voltage value associated with the memory system is based at least in part on periodically adjusting the reference voltage value.

17. The memory system of claim 14, wherein the processing circuitry is further configured to cause the memory system to:
  determine a sampling rate for sensing a temperature of the memory system based at least in part on a configuration,
  wherein determining the first temperature value associated with the memory system is based at least in part on the sampling rate.

18. The memory system of claim 14, wherein, to adjust the reference voltage value, the processing circuitry is configured to cause the memory system to:
  increase the reference voltage value to a respective reference voltage value in accordance with the reference voltage offset value.

19. The memory system of claim 14, wherein, to adjust the reference voltage value, the processing circuitry is configured to cause the memory system to:
  decrease the reference voltage value to a respective reference voltage value in accordance with the reference voltage offset value.

20. A method, comprising:
  determining a first temperature value associated with a memory device during a first phase of operation of the memory device;
  determining a second temperature value associated with the memory device during a second phase of operation of the memory device different than the first phase of operation;
  selecting a reference voltage offset value for the memory device based at least in part on a temperature difference value between the first temperature value and the second temperature value;
  adjusting a reference voltage value associated with the memory device based at least in part on the reference voltage offset value; and
  operating the memory device in accordance with the reference voltage value based at least in part on adjusting the reference voltage value.

21. The method of claim 20, wherein the temperature difference value is based at least in part on a linear relationship between the reference voltage offset value, the first temperature value, the second temperature value, or any combination thereof.

22. The method of claim 20, wherein the temperature difference value is based at least in part on a non-linear relationship between the reference voltage offset value, the first temperature value, the second temperature value, or any combination thereof.

23. The method of claim 20, wherein selecting the reference voltage offset value comprises:
  mapping the temperature difference value to a plurality of reference voltage offset values and a plurality of temperature difference values, wherein the temperature difference value corresponds to one of the plurality of reference voltage offset values and one of the plurality of temperature difference values.

24. The method of claim 20, further comprising:
  monitoring the reference voltage value associated with the memory device during one or both of the first phase of operation or the second phase of operation based at least in part on a configuration,
  wherein adjusting the reference voltage value is based at least in part on monitoring the reference voltage value associated with the memory device during one or both of the first phase of operation or the second phase of operation.

25. The method of claim 24, further comprising:
  semi-statically controlling the reference voltage value associated with the memory device based at least in part on the monitoring,
  wherein adjusting the reference voltage value is based at least in part on semi-statically controlling the reference voltage value.

26. The method of claim 20, wherein adjusting the reference voltage value comprises:
  buffering the reference voltage value to a respective reference voltage value by increasing the reference voltage value by the reference voltage offset value.

27. The method of claim 20, wherein adjusting the reference voltage value comprises:
  buffering the reference voltage value to a respective reference voltage value by decreasing the reference voltage value by the reference voltage offset value.

28. A memory system, comprising:
one or more memory arrays; and
processing circuitry coupled with the one or more memory arrays and configured to cause the memory system to:

determine a first temperature value associated with the memory system during a first phase of operation of the memory system;

determine a second temperature value associated with the memory system during a second phase of operation of the memory system different than the first phase of operation;

select a reference voltage offset value for the memory system based at least in part on a temperature difference value between the first temperature value and the second temperature value;

adjust a reference voltage value associated with the memory system based at least in part on the reference voltage offset value; and operate the memory system in accordance with the reference voltage value based at least in part on adjusting the reference voltage value.

29. The memory system of claim 28, wherein the temperature difference value based at least in part on a linear relationship between the reference voltage offset value, the first temperature value, the second temperature value, or any combination thereof.

30. The memory system of claim 28, wherein the temperature difference value based at least in part on a non-linear relationship between the reference voltage offset value, the first temperature value, the second temperature value, or any combination thereof.

31. The memory system of claim 28, wherein, to select the reference voltage offset value, the processing circuitry is configured to cause the memory system to:

map the temperature difference value to a plurality of reference voltage offset values and a plurality of temperature difference values, wherein the temperature difference value corresponds to one of the plurality of reference voltage offset values and one of the plurality of temperature difference values.

32. The memory system of claim 28, wherein the processing circuitry is further configured to cause the memory system to:

monitor the reference voltage value associated with the memory system during one or both of the first phase of operation or the second phase of operation based at least in part on a configuration, wherein to adjust the reference voltage value is based at least in part on monitor the reference voltage value associated with the memory system during one or both of the first phase of operation or the second phase of operation.

33. The memory system of claim 32, wherein the processing circuitry is further configured to cause the memory system to:

semi-statically adjust the reference voltage value associated with the memory system based at least in part on the monitoring, wherein to adjust the reference voltage value is based at least in part on semi-statically adjusting the reference voltage value.

34. The memory system of claim 28, wherein, to update the reference voltage value, the processing circuitry is configured to cause the memory system to:

buffer the reference voltage value to a respective reference voltage value by increasing the reference voltage value by the reference voltage offset value.

35. An apparatus, comprising:

a pulse amplitude modulation receiver comprising a set of amplifiers, each amplifier of the set of amplifiers comprising a respective reference voltage value input;

a sensor coupled with the receiver and configured to sense a temperature value associated with the receiver; and a controller coupled with the receiver and the sensor, the controller configured to:

determine a respective reference voltage offset value for each of one or more amplifiers of the set of amplifiers of the receiver based at least in part on mapping the sensed temperature value associated with the receiver to a relationship between reference voltage offset values and temperature differential values associated with the receiver;

adjust a respective reference voltage value for each of the one or more amplifiers of the set of amplifiers of the receiver based at least in part on the respective reference voltage offset value for each of one or more amplifiers of the set of amplifiers of the receiver; and operate the receiver in accordance with the respective reference voltage value for each of the one or more amplifiers of the set of amplifiers of the receiver.

* * * * *